Figure 1:
Figure 2:
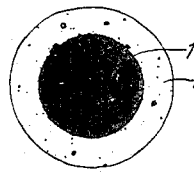
Figure 3:
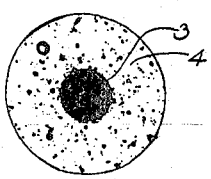
Figure 4:
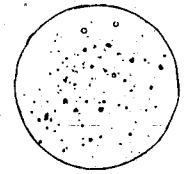

Feb. 5, 1946.  M. L. HERZOG  2,394,449
MANUFACTURE OF EXPLOSIVES
Filed Dec. 12, 1942

INVENTOR
Milton L. Herzog
BY
Lionel E. Goff
ATTORNEY

Patented Feb. 5, 1946

2,394,449

UNITED STATES PATENT OFFICE 2,394,449

MANUFACTURE OF EXPLOSIVES

Milton L. Herzog, Glendale, Mo., assignor to Olin Industries, Inc., a corporation of Delaware Application December 12, 1942, Serial No. 468,842

10 Claims. (Cl. 52—20)

This invention relates to the manufacture of explosives and more particularly to the manufacture of granular explosives, such as those having a base of nitrocellulose.

One of the objects of this invention is to provide a process whereby the treating steps may be controlled so as to secure efficient and economical operation.

Another object is to provide a process whereby the incorporation of additional ingredients such as the usual modifying agents, for instance, deterrents, stabilizers or accelerators, into a granular explosive may be efficiently and readily effected.

Another object is to provide a process in which the removal of solvent from the powder grains is effectively controlled to permit a termination of the treatment at any desired degree of the solvent removal.

Another object is to provide a process in which the operations may be controlled to secure a superior and readily duplicable product.

Another object is to provide a control test for the manufacture of granular explosives, whereby the change in internal structure of the grains can be examined during the processing steps and successive treatments governed thereby.

Another object is to provide effective means for controlling a treatment to remove volatile liquids from powder grains.

Still another object is to provide effective means for controlling treatments to coat powder grains with deterrents and other modifying agents.

Other objects will become apparent to those skilled in the art when the following detail description is read in connection with the accompanying drawing, in which Figures 1 to 20 illustrate the appearance, at a magnification of about 50 to 1, of sections of certain powder grains prepared in accordance with this invention.

In accordance with this invention a process is provided for terminating a treatment of explosive grains with a modifying agent at the optimum point, which is determined by examining the change in opacity of the grains during the treatment.

Although having effective application in the manufacture of other explosive grains, the process of the present invention is particularly suited for the manufacture of gelatinous globular powder grains prepared in accordance with processes such as are disclosed in U. S. Letters Patent No. 2,027,114, issued to Olsen et al. January 7, 1936, No. 2,160,626, issued to Schaefer May 30, 1939, and No. 2,213,255, issued to Olsen et al. September 3, 1940, in which a powder base suspended in water is treated with a water immiscible liquid solvent to form grains and in which the grains may then be treated with various modifying agents in the water suspension.

It has been found according to the present invention that when a granular explosive is treated with modifying agents, such as the usual deterrents, the usual type solvents, nitroglycerine and the like, or mixtures thereof, the degree of coating, penetration or removal of such modifiers can be readily determined by the degree of transparency shown by the grains. For instance, a uniformly opaque powder grain, Figure 1, may become translucent throughout, Figure 4, when completely impregnated with such a modifier, or a translucent powder grain will show a difference in transparency when coated or impregnated with such modifiers depending on the amount of impregnation or coating. Such differences in transparency of the grain are readily detectable when the powder grains are sectioned and examined in accordance with this invention.

In carrying out the process of this invention, representative grains of the explosives are removed from the mass under treatment, sectioned, and the sections are then examined to determine their opacity. When grains are obtained giving sections showing the opacity necessary for the desired result for the particular treatment underway, the treatment is terminated. This process is of decided advantage since prior methods involving more or less extensive chemical analysis have not been found suitable as a means of controlling such treatments and in any event do not give a clear picture as to the internal composition and structure of the explosive grain.

The degree of opacity of the grains indicating that the treatment should be terminated will of course vary with different types and conditions of treatment and with the result desired to be obtained during the treatment. For instance, when powder grains are being impregnated with a liquid modifier and representative grains are periodically removed and sectioned, the first visible effect of impregnation is usually a ring 2, Figure 2, around the periphery of the section which is more transparent than the center portion 1 and which usually increases in size 4, Figure 3, as the treatment proceeds until the whole grain attains a uniform transparency, Figure 4, at or before which time the treatment may be terminated depending on the result desired. Similarly, when a solvent or other component is removed from the powder grains, the first visible effect when successive sections are examined is usually that a less transparent core 15, Figure 13, appears at the center of the grain which increases in size 17, 19, 21 and 23 in Figures 14 to 17 respectively, as the treatment is continued until the grain has a uniform opacity throughout, Figure 18, at or before which time the treatment is terminated depending on the result desired. Likewise, depending on the previous treatments and the nature of the treatment underway, the grain may have a more or less opaque core at the beginning of the treatment which may increase or decrease in size as the treatment proceeds and the treatment is then terminated when the desired change in transparency of the grain is effected.

The character of the treatment given and the result desired are the main factors governing the appearance to be attained in the grain section before the treatment is terminated. It has usually been found desirable to have some standard by which the transparency of the grain sections can be measured in order to insure that the treating operation may be terminated at the optimum point. This can readily be accomplished by taking photographs of a series of sections prepared from grains removed periodically during the treatment and thereafter using the photograph of the section indicating that the treatment should be terminated as a standard for comparison with sections of grains removed from grains undergoing treatment of similar character. It will, of course, be apparent that such a standard photograph can be prepared for each type of treatment used and result desired so that any desired effect can then be accurately duplicated.

The process of this invention is thus of great advantage when it is desired to leave a definite amount of solvent in powder grains for the purpose of subsequent treatment, or when it is desired to impregnate or coat explosive grains with a modifying agent, or, for instance, when in the interest of economy it is desired to terminate a treatment immediately upon the attainment of a desired result.

The thin sections of the explosive grains may be prepared in any suitable manner provided that care is taken to prevent any surface flow of the various components of the grain. The thickness of the grain section will vary with the degree of opacity of the grain, it being necessary to provide sections thin enough to permit the passage of some light in order to properly examine the grain. With gelatinous globular powder grains having a diameter in the range of about 0.010 inch to 0.030 inch, a section having a thickness of about 0.0015 inch has usually been found satisfactory. Further, with smaller globular grains a thinner section must be prepared to prevent the high degree of curvature at the edge of the section of disk from acting as a lens and distorting the actual appearance of the section.

The preferred method of preparing the grain sections in accordance with this invention is to first cement the grain to a glass microscope slide with a suitable mounting agent such as an aqueous dispersion of gum arabic and then to remove slightly less than one-half the grain by carefully grinding, for instance on about number 0 grit metallurgical paper, care being used to grind to a flat surface with a reciprocal motion and with substantially no pressure except the weight of the microscope slide in order to prevent surface flow of the constituents of the grain. The flat ground surface of the grain is then polished by a similar grinding operation, for instance with the use of about number 0000 grit metallurgical paper and with a reciprocal motion at right angles to that employed in the coarse grinding. The polishing is continued until all lines on the surface caused by the grinding abrasive have disappeared.

The grain is then loosened from the microscope slide for instance by flooding with water, mounted with the flat surface toward the glass, and the above grinding and polishing operation is repeated to give a section or disk of the desired uniform thickness. The section is then ready for examination and since such explosive sections are usually small, a microscope is usually required for the examination.

If, in the preparation of sections of explosive grains, it is desired to use a microtome instead of a grinding operation, extreme care must be exercised to remove from the surface of the sections all scratches formed by the cutting blade and all displaced components of the grain. Frequently it is impossible to employ such cutting devices, particularly with explosive grains composed of or having relatively plastic components, since it is a characteristic of such devices that the pressure employed in cutting tends to distort the whole section or leave marks in the surface so that upon examination the true nature of the grain is misrepresented by the appearance of the section.

By way of illustration following is a typical embodiment of the present invention in which gelatinized globular powder is treated with nitroglycerine in the presence of a solvent to form double-base powder and the solvent is then removed from the grains.

About 12.000 pounds of nitrocellulose in the form of gelatinous more or less spherically shaped particles having a diameter of about 0.010 to 0.030 inch, such as may be prepared according to the process disclosed in U. S. Letters Patent No. 2,027,114 issued to Olsen et al. January 7, 1936, are suspended by means of suitable agitation in about 40,000 pounds of water at room temperature.

To this suspension there is then added a mixture consisting of 1636.5 lbs. of nitroglycerine, 981.9 lbs. toluene, 654.6 lbs. ethyl acetate, 1.75 lbs. of gum arabic, and 9000 lbs. of water. The suspension is then heated to 65° C. During the entire treatment at 65° C. representative samples of the powder grains are removed hourly from the suspension for microscopic examination.

As soon as the powder sample is removed from the suspension about 5 grains are cemented to a glass microscope slide with the aid of a 35% aqueous dispersion of gum arabic. five grains being used to increase the accuracy of sampling. The gum arabic is then allowed to dry for about 3 to 5 minutes. The powder grains are then ground to approximately half their original thickness on number 0 grit metallurgical paper, which is held securely and backed by a flat surface. The outer edges of the slide are supported so as to assist in generating a flat surface on the powder grains by piling narrow strips of paper on each other to act as a support, and after grinding to a point where the abrasive is no longer cutting the sample, a strip of paper is removed from each edge of the slide and the grinding is continued. In this manner the depth to which the sample is cut can be suitably controlled. The motion employed while grinding is reciprocal and consists of a very light feathery touch, with no downward pressure exerted on the slide. When a little less than half of the grain has been removed, the sections and the mount are carefully dusted with a camel's hair brush in order to remove any adhering pieces of the number 0 grinding grit. After the mount has been thoroughly cleaned it is polished on a number 0000 grit metallurgical paper with a reciprocal motion at right angles to the motion employed in the coarse grinding. During the polishing operation the same light feathery touch is employed as when coarse grinding, with no downward pressure exerted on the slide. The polishing operation is continued until all lines on the surface from the number 0 grit have disappeared.

A drop of water is now placed on the mount which after a few seconds will have sufficiently softened the gum arabic to allow the sections to be lifted from the slide. The sections are transferred to a drop of water on a clean slide and all particles of grit washed from the polished surfaces. The sections are then cemented to a clean slide with a minute amount of gum arabic with the flat side of the samples attached to the glass slide. In cementing the flat surface of the section to the slide it is usually necessary to employ about a 5% dispersion of gum arabic in water in order to eliminate the inclusion of air bubbles between the section and the glass slide. The gum arabic cement is allowed to dry for about 3 to 5 minutes, after which the same grinding and polishing operations are followed as described above, to yield final sections having a uniform thickness of about 0.0015 inch.

The sections are then washed thoroughly with water to remove adhering grit particles and are then dried. The drying is preferably accomplished in about 10 minutes by means of an infrared lamp so adjusted as to produce a temperature of about 50° C. to 55° C. at the surface of the sections. The five sections thus obtained are then examined under the microscope. The total time required in preparing the sections from the time the sample is taken until the microscopic examination is completed is usually about 30-45 minutes.

In Figures 1 to 8 are shown representative sections illustrating the change in appearance of the grains during the treatment at 65° C. The powder grains before the treatment gave an opaque section, Figure 1. After a short period of the treatment with the nitroglycerine and solvent, sections were obtained having a substantially transparent ring 2 around a more or less opaque core 1. As the treatment continued the transparent ring increased in size 4, Figure 3, and the size of the core 3 diminished until after about 10 hours treatment the grains were substantially transparent Figure 4, indicating complete impregnation.

Figure 5:
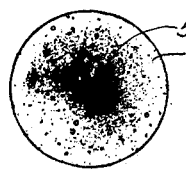
Figure 6:
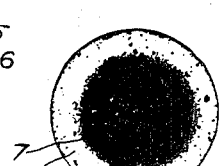

At this point air is then bubbled through the suspension to remove the solvent from the powder grains, after a short period of treatment, core 5, Figure 5, became visible, being slightly less transparent than the ring 6, and as the treatment continued the core became less and less transparent providing an opaque core 7 and substantially transparent ring 8. Further treatment resulted in a core 9 of increased size and transparent ring 10 of diminished size, and after about 20 hours a completely opaque grain, Figure 8, was obtained indicating complete removal of the solvent.

In some cases when the powder is to be coated with a deterrent, it is desirable to leave a small amount of the solvent in the powder grains, and this can be readily accomplished by terminating the treatment when sections are obtained indicating that the powder has the proper residual solvent content.

Figure 7:
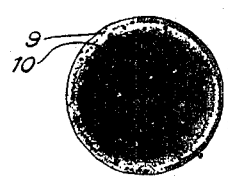
Figure 8:
Figure 9:
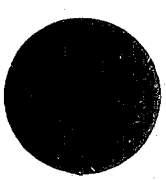
Figure 10:
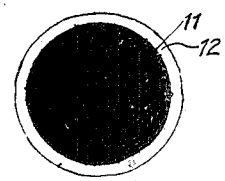
Figure 11:
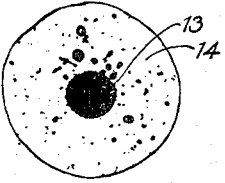
Figure 12:
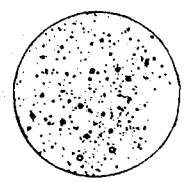
Figure 13:
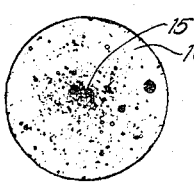
Figure 14:
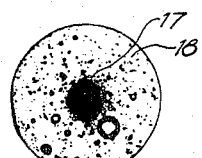
Figure 15:
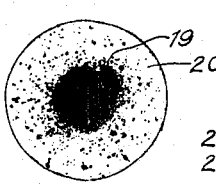
Figure 16:
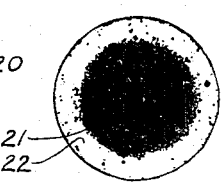
Figure 17:
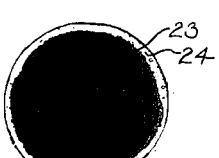
Figure 18:

For instance, if it is desired to treat the powder grains described in the above specific example with a deterrent, this may be accomplished as follows: When sections having the opacity indicated in Figure 7 are obtained, the treatment is terminated by stopping the passage of air through the suspension, raising the temperature of the suspension to about 72° C. and then adding about 1000 pounds of diphenylphthalate emulsified in 2400 pounds of water at a temperature of 95° C. The temperature of the suspension is maintained at 72° C. until the coating with diphenylphthalate is completed.

Figure 19:
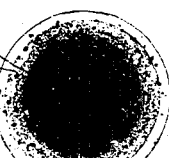
Figure 20:
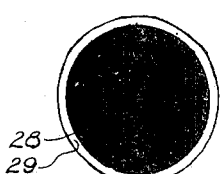

The coating of powder with diphenylphthalate or other deterrent may likewise be controlled by the examination of sections of powder grains removed during the treatment in accordance with this invention. The deterrent coating obtained in the above example appears as a more or less transparent portion enveloping the grain. For instance, a section of a deterrent coated double-base powder grain is shown in Figure 19 in which the deterrent layer is indicated at 27, the core at 25, and the intermediate portion composed mostly of nitrocellulose and nitroglycerine at 26. Similarly, a single base powder coated with deterrent is illustrated in Figure 20 in which the deterrent layer is shown at 29 and the core at 28.

In Figures 9 to 18 are shown representative sections of powder grains removed during a treatment of globular powder with nitroglycerine and solvent, similar to the process described in the specific example above, except that a substantially greater proportion of nitroglycerine was employed, in the treatment, namely about 20% based on the nitrocellulose. The powder grains employed in the treatment were substantially opaque Figure 9. After a short period of treatment, a transparent ring 12 formed with the core 11 and as the treatment continued the transparent ring became larger 14 and the core gradually decreased in size 13 and finally disappeared Figure 12, indicating complete impregnation of the grain. Removal of solvent was then started and after a short period a small core 15 appeared within the more or less transparent portion 16, as contrasted with the relatively large core 18 of the specific example above. As the treatment progressed the core increased in size, 17, 19, 21 and 23, and the more or less transparent portion diminished, 18, 20, 22 and 24, until substantially opaque sections were obtained, Figure 18, indicating complete removal of the solvent.

Under certain circumstances, depending on the grains being treated and the modifier employed, the grains at the start of a treatment may be substantially transparent and no opaque core may be formed during the treatment, in which case the effect or position of the modifier in the grain can usually be determined by a dark line separating the transparent unaffected portion of the grain from the transparent modified portion of the grain, the dark line being caused by the difference in the refractive index of the modifier and of the substance of the grain. In some instances, however, the effect or position of the modifier in the grain is more easily determined by passing polarized light through the grain sections instead of ordinary light and the process is then carried out by examining the sections with polarized light.

It should thus be understood that the appearance of the sections either at the start, or during, or at the end of a treatment may vary appreciably depending on the kind and amount of modifier used, conditions of treatment, and nature of the grain being treated, so that no one standard section will serve for all such different treatments. However, having once established the type of modifier, conditions of treatment, etc., capable of giving the result desired, a standard section may be prepared for controlling the treatment and the product can then be readily duplicated by the process of this invention.

By employing the process of this invention as described above, it is possible to obtain a very exact duplication in successive lots of explosive manufactured, and thus greatly improve the uniform quality of the product.

By the terms "modifying agents" and "modifiers" as used herein is meant any reagent used in the preparation of a granular explosive, or used to modify or change the characteristics of explosive grains, and having an effect on the grains detectable when sections of the grains are examined in accordance with this invention. Examples of such modifying agents are the usual accelerators and deterrents used in treating powder and other explosive grains, such as nitroglycerine, dinitrotoluene, dibutylphthalate and substituted ureas; solvents used in preparing and treating powder grains, such as ethyl acetate, toluene, and benzene; and flash inhibitors, stabilizers and moisture profing agents used in the modification of explosive grains.

By the term "treatment" as used herein with reference to explosive grains is meant any processing step in which a "modifying agent" is used in the preparation of a granular explosive, or used to modify or change the characteristics of explosive grains.

By the terms "examination," and "examining," as used herein with reference to thin sections of explosive grains, is meant visual examination of such sections or of photographs, for instance photomicrographs, of such sections. In the case of small sections the visual examination or photographing may be accomplished with the use of a microscope or other magnifying lens.

By the term "opacity" as used herein with reference to a grain section is meant the appearance of the section when subjected to examination in accordance with this invention and the opacity of sections will vary in accordance with the transmission, adsorption and/or reflection of light by the sections.

The term "light" as used herein with reference to the examination, appearance and/or opacity of grain sections is meant any form of radiant energy which can be used to detect differences in such sections or components of such sections. Although, ordinary "white" light is usually satisfactory for examination of the sections, there are some cases, depending on the kind of explosive grain being examined and characteristics of the modifier used, in which the examination may be facilitated by employing monochromatic visible light, or light of selected wavelength in the invisible range, for instance in the ultra-violet or infra-red. When light outside of the visible range is employed for the examination, it is necessary to photograph the sections, or use some other suitable means, for instance a fluorescent screen, for detecting the opacity of the sections.

It will be understood that while the treatment of gelatinous globular powder was described in the specific embodiment above, various other powder and explosive bases may be employed to secure the advantages of this invention. It will be further understood that various changes may be made in the specific details without departing from the spirit and scope of this invention, and it is therefore to be understood that this invention is not to be limited by the details described herein except as set forth in the appended claims.

Having thus described the invention what is claimed is:

1. In the manufacture of granular explosives, the process of controlling the treatment of explosive grains with a modifying agent which comprises preparing sections of representative grains, examining the sections to determine their opacity, and terminating said treatment when sections are obtained having an opacity indicating that the desired degree of modification has been accomplished.

2. In the manufacture of granular explosives, the process of controlling the treatment of explosive grains with a coating agent which comprises grinding representative grains removed from the mass during said treatment to form thin sections thereof, examining said sections to determine their opacity, and terminating said treatment when sections are obtained having an opacity indicating that the desired coating has been accomplished.

3. In the manufacture of granular explosives, the process of controlling a treatment of powder grains which comprises preparing sections of said grains removed from the mass during said treatment, examining said sections, and terminating said treatment when sections are obtained having an opacity indicating that the desired modification has been accomplished.

4. In the manufacture of granular explosives, the process of controlling a treatment for the removal of a solvent from powder grains in liquid suspension which comprises preparing thin sections of representative powder grains removed from the suspension during said treatment, examining the sections to determine their opacity, and terminating said treatment when sections are obtained having an opacity indicating that the desired degree of solvent removal has been accomplished.

5. In the manufacture of granular explosives, the process of controlling a treatment of powder grains with a modifying agent which comprises grinding representative powder grains removed from the mass during said treatment to form uniformly thin sections thereof, examining said sections to determine their opacity, and terminating said treatment when sections are obtained having an opacity indicating that the desired modification has been accomplished.

6. In the manufacture of granular explosives, the process which comprises treating powder grains in a liquid suspension with a modifying agent in the presence of a solvent for said grains, treating said grains to remove said solvent therefrom, preparing uniformly thin sections of representative powder grains removed from the suspension during said solvent removal treatment, examining said sections to determine the residual solvent content of said powder as measured by the opacity of the sections, and terminating said treatment when sections are obtained having an opacity indicating that the desired degree of solvent removal has been accomplished.

7. In the manufacture of granular explosives, the process of controlling a treatment for the removal of solvent from powder grains in liquid suspension which comprises grinding representative powder grains removed from the suspension during said treatment to form uniformly thin sections thereof, examining said sections under the microscope to determine their opacity, and terminating said treatment when sections are obtained having an opacity indicating that the desired degree of solvent removal has been accomplished.

8. In the manufacture of granular explosives, the process which comprises treating powder grains in a liquid suspension with a modifying agent in the presence of a solvent for said grains, treating said grains to remove said solvent therefrom, grinding representative powder grains removed from the suspension during said solvent removal treatment to form uniformly thin sections thereof, examining said sections to determine their opacity and terminating said solvent removal treatment when sections are obtained having an opacity indicating that the desired degree of solvent removal has been accomplished.

9. In the manufacture of granular explosives, the process of controlling a treatment for the coating of powder grains with a deterrent, which comprises preparing sections of representative grains, examining the sections to determine their opacity, and terminating said treatment when sections are obtained having an opacity indicating that the desired coating has been attained.

10. In the manufacture of granular explosives, the process which comprises heating powder grains containing volatile constituents in a liquid suspension, and controlling the removal of said volatile constituents from said powder grains by grinding representative powder grains removed from the suspension during said heating treatment, forming uniformly thin sections from said removed powder grains, examining said sections to determine their opacity, and terminating said heating treatment when sections are obtained having an opacity indicating that the desired removal of volatile constituents has been accomplished.

MILTON L. HERZOG.